Figure 1:
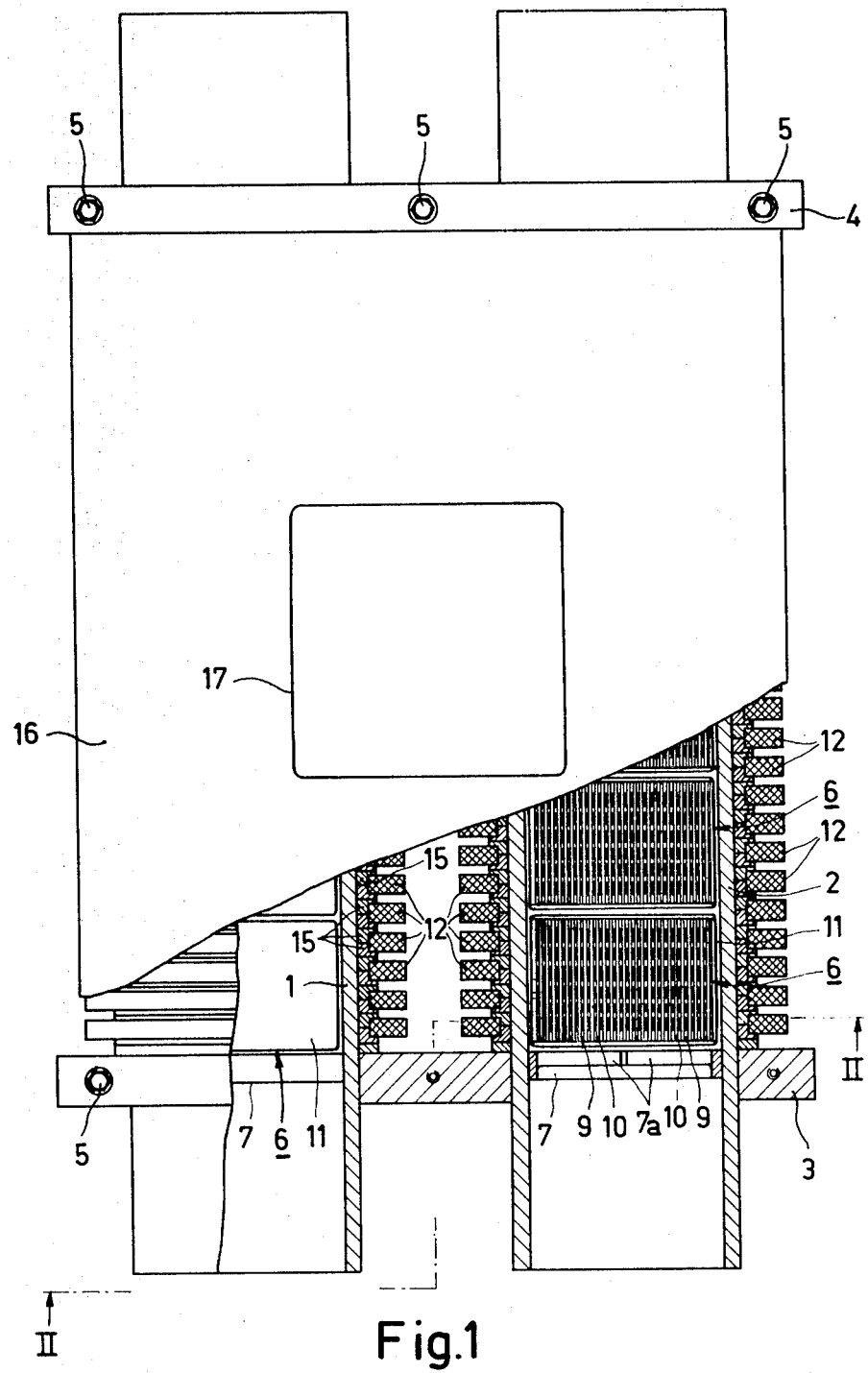

United States Patent

[11] 3,581,898

| | | |
|---|---|---|
| [72] | Inventor | Arthur James Tyrrell<br>Ashtead, England |
| [21] | Appl. No. | 825,770 |
| [22] | Filed | May 19, 1969 |
| [45] | Patented | June 1, 1971 |
| [73] | Assignee | U.S. Philips Corporation<br>New York, N.Y. |

[54] MAGNETIC FILTER
5 Claims, 4 Drawing Figs.

[52] U.S. Cl. .................................... 210/222
[51] Int. Cl. ........................................ B01d 35/06
[50] Field of Search ......................... 210/42, 222, 223; 209/232, 216

[56] References Cited
UNITED STATES PATENTS

| | | | |
|---|---|---|---|
| 1,697,142 | 1/1929 | Roller | 210/222(UX) |
| 3,343,676 | 9/1967 | Tyrell | 210/223 |
| 2,822,089 | 2/1958 | Woodruff | 210/222 |

OTHER REFERENCES

Underhill, Charles R. Van Nostrand & Co., (1911) pp 132,133,134. Sci. Library QC 760 458 s Norrie, H. S., Spon & Chamberlin, N.Y. (1901) pp 12,13,14. Sci. Library QC 645, S 35 I

*Primary Examiner*—Reuben Friedman
*Assistant Examiner*—T. A. Granger
*Attorney*—Frank R. Trifari

ABSTRACT: A magnetic filter for use in a pipeline which separates ferromagnetic particles from the fluid within the pipeline. Filtering grids arranged within two pipes are energized by externally surrounding coils, such that the flux generated in one pipe is carried by the other pipe.

INVENTOR.
ARTHUR J. TYRRELL
BY
AGENT

MAGNETIC FILTER

The invention relates to a magnetic filter for separating ferromagnetic particles from a fluid.

Magnetic filters are used in high-pressure pipelines in power stations. A filter suitable for such use may comprise filtering grids of ferromagnetic material arranged inside a section of the pipeline and surrounded externally of the pipeline by energizing coils for inducing a magnetic field in the grids. Ideally the section of pipeline containing the grids would consist of nonmagnetic steel pipe, but such pipe of the size and quality required is very difficult to obtain commercially. Alternatively the section of pipeline may be ordinary steel pipe. The pipe would than have to be magnetically saturated before the desired field could be induced in the grids but this would require no more power than would the use of nonmagnetic steel pipe. However, the very large quantities of magnetic flux generated would necessitate the provision of correspondingly heavy and expensive yokes.

According to the invention a magnetic filter comprises two pipes of ferromagnetic material, each of which contains a filtering grid of ferromagnetic material and is surrounded by an energizing coil for inducing a magnetic field in the grid, and which are arranged side-by-side and connected by yokes of ferromagnetic material to form a magnetic circuit so that the flux generated in one pipe is carried by the other pipe. This construction not only has the advantage of economic use of materials but can also be arranged to produce practically no external field. A filter according to the invention can readily be built into a pipeline without requiring the provision of magnetic insulation in the pipeline.

Figure 2:
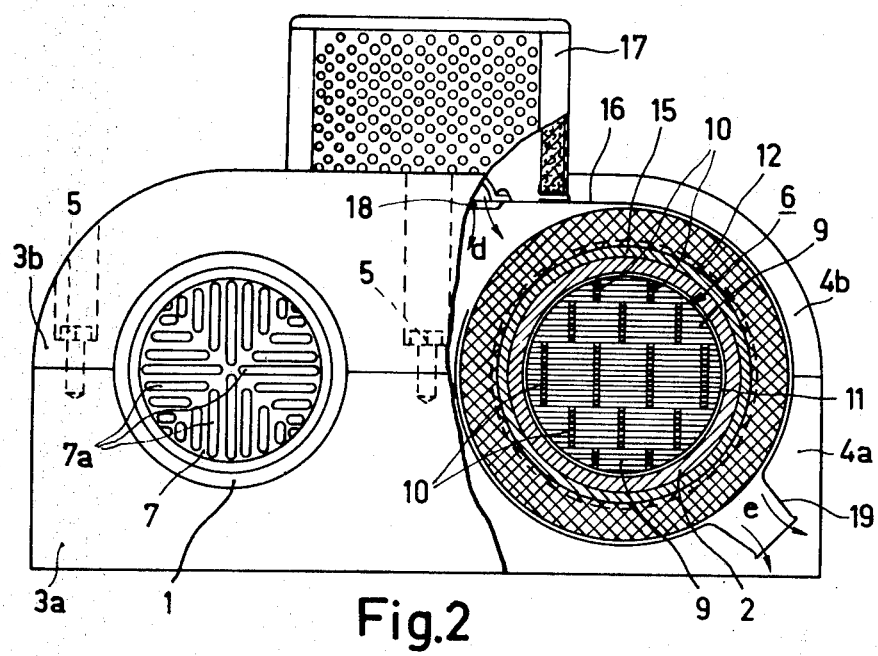
Figure 3:
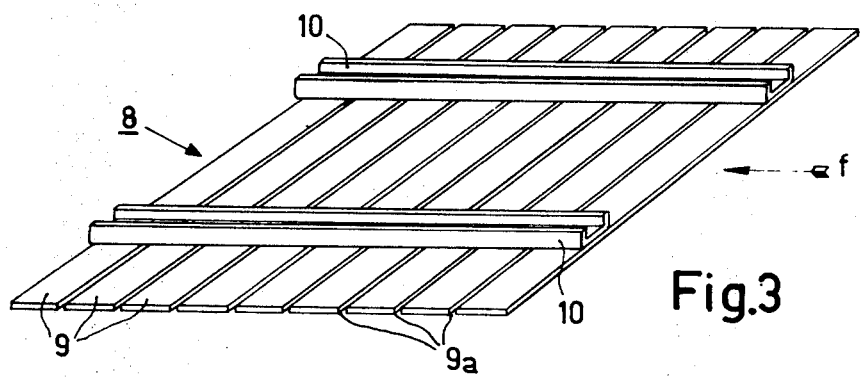
Figure 4:
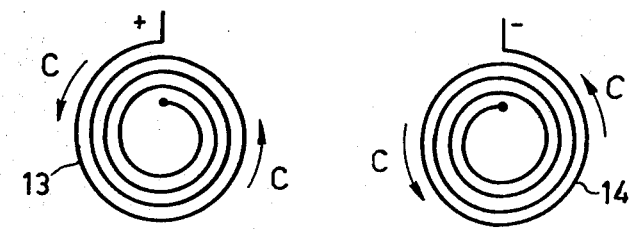

In order that the invention may be readily carried into effect, reference will now be made by way of example to the accompanying drawings, in which FIG. 1 is a plan view, partly in section, of a magnetic filter constructed in accordance with the invention, FIG. 2 is a part-sectional end view of the filter shown in FIG. 1, the section being taken on the line II–II in FIG. 1, FIG. 3 is an enlarged perspective view of an element of a grid of the filter, and FIG. 4 is a diagrammatic illustration of the windings of an energizing coil of the filter.

The filter shown in the drawings comprises two mild steel pipes 1 and 2 which are arranged parallel to one another and connected by two soft-iron yokes 3 and 5. Each yoke consists of a plate which, as shown in FIG. 2, comprises two separate parts 3a, 3b and 4a, 4b respectively which are clamped on the pipes 1 and 2 by means of bolts 5. Each part of each yoke has two semicircular recesses in its periphery to fit on the two pipes. Between the yokes 3 and 4 each pipe contains a series of filtering grids 6 arranged along the pipe. At each end of the series of grids in each pipe a slotted grating 7 of soft ferromagnetic material extends across the pipe. Each grid is composed of a plurality of elements 8 each of which, as shown in FIG. 3 comprises a number of strips 9 of soft ferromagnetic secured in coplanar, parallel, spaced relationship by bars 10 of nonferromagnetic material, for example, nonmagnetic stainless steel. These bars are preferably of channel section for stiffening purposes. The elements 8 of each grid are contained in and held together by a sleeve 11 (FIGS. 1 and 2) of nonferromagnetic material, for example, nonmagnetic stainless steel, which fits in the respective pipe 1 or 2. The elements in each sleeve 11 are assembled parallel to one another in planes lying parallel to the axis of the sleeve, adjacent elements being spaced apart by the bars 10. Each sleeve is inwardly flanged at its ends to prevent axial movement of the elements 8.

Between the yoke 3 and 4 each pipe is surrounded by energizing coils 12 for inducing magnetic fields in the grids 6 in the pipe. Each coil consists of two trips of copper each wound in a flat spiral as shown at 13 and 14 respectively in FIG. 4, in which the strips are shown separated. The two strips, each covered with electrically insulating material, are laid coaxially together and connected at their inner ends. The connections between adjacent coils are made at the outer ends of the strips. This avoids bringing inside leads to the outside of the coils. The two end coils on each pipe are connected to a source of electrical supply (not shown.) The strips of each coil, and also the coils themselves, must be so assembled that the current will flow in the same direction throughout the coils. The direction of flow of the current through the two associated strips shown in FIG. 4 is indicated by the arrows c. The two strips of each coil, when they have been assembled, are bound together with electrical insulating tape which, if the filter is to be used for filtering fluids having high temperatures, may be made of a material that also has heat-resisting properties.

The coils 12 are held in position on the pipes 1 and 2 by spacer rings 15. Each spacer ring is formed in one side with a rebate which extends round the outer periphery of the ring, and the rings are arranged on the pipes in contact with one another and with the rebates in adjacent rings facing in opposite directions so that the rebates in successive pairs of adjacent rings form grooves for receiving the inner peripheries of the coils. If high-temperature fluids are to pass through the pipes, the spacer rings may be made of a heat-insulating material, for example, bonded glass-fiber, to protect the coils from the heat. If necessary, the coils may be cooled by passing air over them. An arrangement for doing this is shown in FIGS. 1 and 2 and comprises ducting 16 which enshrouds the coils and through which air is blown by a fan (not shown) arranged inside an air filter 17. The air enters the ducting through an inlet 18 (FIG. 2), as indicated by the arrows d, and leaves the ducting through two outlets 19 (only one can be seen in FIG. 2), as indicated by the arrows e.

The filter may be installed in a pipeline by interposing bifurcated pipe unions or junction pieces between the ends of the filter and the pipeline.

In the operation of the filter, the coils 12 induce magnetic fields in the grids 6 and, through the yokes 3 and 4, in the gratings 7. The slots (designated 7a in FIG. 2) in each grating are arranged in a pattern (shown in FIG. 2) which will give maximum radial paths for the magnetic flux and at the same time permit free flow of fluid through the grating. In the grids 6 magnetic fields are produced across the gaps (designated 9a in FIG. 3) between the strips 9 of each grid element 8. The contaminated fluid flowing through each of the pipes 1 and 2 will pass first through the grating 7 at the upstream end of the series of grids 6 in the respective pipe. This grating will hold back any large objects in the flow of fluid. Small particles of contaminant will pass through the slots in the grating and be carried with the fluid through the spaces between adjacent elements 8 in the grids 6. The direction of flow of the fluid in relation to the elements 8 is indicated by the arrow f in FIG. 3. As the fluid flows through the spaces between the elements 8, particles of ferromagnetic contaminant in the fluid will be trapped by the magnetic fields in the gaps 9a between the strips 9 of the elements 8 and so removed from the stream of fluid. Eventually the gaps 9a will become completely filled with contaminant which can then be flushed away after demagnetizing the grids 6 by switching off the supply of current to the coils 12.

I claim:

1. A magnetic filter for separating ferromagnetic particles from a fluid comprising a pair of conduit pipes arranged side-by-side for passing therethrough the fluid to be filtered, said pipes being made of ferromagnetic material, upper and lower yoke members of ferromagnetic material clamped about said pipes for connecting said pipes in a rigid parallel relationship, a pair of slotted gratings of ferromagnetic material secured within each of said pipes said gratings being axially spaced apart positioned parallel to each other and oriented in a plane perpendicular to the longitudinal axis of each pipe, a plurality of filtering grids carried within each of said pipes between said gratings, each of said grids comprising a plurality of screen elements comprising parallel strips of ferromagnetic material having spaces therebetween and a plurality of nonferromagnetic support bars arranged perpendicular to said strips being secured thereto to form a rigid screen element, said screen elements being positioned parallel to each other and oriented in planes perpendicular to the plane of said gratings so that said supporting bars extend in a direction parallel to the longitudinal axis of said pipes, and means for inducing a magnetic field in said grids whereby said ferromagnetic particles will be attracted to and trapped in said screen elements, said means comprising a plurality of energizing coils surrounding each of said pipes and means for energizing said coils so that a magnetic circuit is established whereby the flux generated in one pipe will be carried by the other pipe.

2. The magnetic filter according to claim 1, wherein said energizing coils comprises two strips of electrically conductive material each of said strips being wound in a flat spiral arrangement of opposite directions, said spiral strips being covered with insulating material and coaxially arranged, the inner ends of said spirally wound strips being connected together, the outer ends of said strips being connected with the outer ends of adjacent coils.

3. The magnetic filter as claimed in claim 2, wherein the coils surrounding each pipe are held in position by spacer rings each formed on one side with a rebate which extends about the outer periphery of the ring, the rings being arranged in the pipe in contact with one another and with the rebates in adjacent rings facing in opposite directions so that the rebate in successive pairs of adjacent rings form grooves for receiving the inner peripheries of the coils.

4. The magnetic filter as claimed in claim 3, wherein the spacer rings are made of a heat-insulating material.

5. The magnetic filter as claimed in claim 4, further comprising means for cooling the coils when high-temperature fluids are passed through the pipes, said means comprising a fan and ducting which enshrouds the coils so as to direct the forced air over them.

PO-1050
(5/69)

UNITED STATES PATENT OFFICE
CERTIFICATE OF CORRECTION

Patent No. 3,581,898                                Dated June 1, 1971

Inventor(s) ARTHUR JAMES TYRREL

It is certified that error appears in the above-identified patent and that said Letters Patent are hereby corrected as shown below:

Col. 1, line 25,   "This" should start a paragraph;

line 45,   "5" should be --4--;

line 55,   after "ferromagnetic" insert --material--;

line 69,   "trips" should be --strips--;

IN THE CLAIMS

Claim 3, line 5,   "in" first occurence should be --on--.

Signed and sealed this 3rd day of October 1972.

(SEAL)
Attest:

EDWARD M. FLETCHER, JR.                    ROBERT GOTTSCHALK
Attesting Officer                          Commissioner of Patents